US012315688B2

(12) United States Patent
Park

(10) Patent No.: US 12,315,688 B2
(45) Date of Patent: May 27, 2025

(54) ARC EXTINGUISHING ASSEMBLY

(71) Applicant: LS ELECTRIC CO., LTD., Anyang-si (KR)

(72) Inventor: Yong Ik Park, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 154 days.

(21) Appl. No.: 17/909,639

(22) PCT Filed: Feb. 26, 2021

(86) PCT No.: PCT/KR2021/002494
§ 371 (c)(1),
(2) Date: Sep. 6, 2022

(87) PCT Pub. No.: WO2021/177675
PCT Pub. Date: Sep. 10, 2021

(65) Prior Publication Data
US 2023/0119322 A1 Apr. 20, 2023

(30) Foreign Application Priority Data
Mar. 3, 2020 (KR) ........................ 10-2020-0026654

(51) Int. Cl.
*H01H 33/08* (2006.01)

(52) U.S. Cl.
CPC .................................. *H01H 33/08* (2013.01)

(58) Field of Classification Search
CPC .......... H01H 9/46; H01H 9/342; H01H 9/345; H01H 9/346; H01H 9/362; H01H 2009/348; H01H 2009/347; H01H 2009/365; H01H 2009/367; H01H 33/08; H01H 33/10; H01H 71/0235; H01H 71/18; H01H 71/0264
USPC .... 218/155, 15, 34–38, 40, 46, 81, 103, 105
See application file for complete search history.

(56) References Cited

U.S. PATENT DOCUMENTS

| | | | | |
|---|---|---|---|---|
| 5,731,561 A | | 3/1998 | Manthe et al. | |
| 6,248,970 B1 | * | 6/2001 | DiMarco | H01H 9/46 218/15 |
| 7,186,941 B2 | * | 3/2007 | Yeon | H01H 9/346 218/15 |
| 7,488,915 B2 | * | 2/2009 | Pollitt | H01H 9/342 335/201 |
| 7,521,645 B2 | * | 4/2009 | Shea | H01H 9/36 218/151 |

(Continued)

FOREIGN PATENT DOCUMENTS

| | | |
|---|---|---|
| EP | 2393094 A1 | 12/2011 |
| EP | 2230678 B1 | 11/2015 |

(Continued)

OTHER PUBLICATIONS

Translation of KR20130089541 (Original document published Aug. 12, 2013) (Year: 2013).*

(Continued)

*Primary Examiner* — William A Bolton
(74) *Attorney, Agent, or Firm* — K&L Gates LLP

(57) ABSTRACT

The present disclosure relates to an arc extinguishing assembly which, when an arc is generated, has a structure that can push the generated arc in a direction farther away from a stationary contact point by forming a transient pressure difference between arc guides.

20 Claims, 17 Drawing Sheets

(56) References Cited

U.S. PATENT DOCUMENTS

| | | | | |
|---|---|---|---|---|
| 8,772,665 | B2 * | 7/2014 | An | H01H 9/346<br>218/16 |
| 9,396,890 | B2 * | 7/2016 | Smeltzer | H01H 9/36 |
| 10,128,069 | B1 | 11/2018 | Ruempler et al. | |
| 10,192,700 | B2 * | 1/2019 | Rival | H01H 33/10 |
| 2009/0255906 | A1 * | 10/2009 | Rane | H01H 9/34<br>218/151 |
| 2013/0284702 | A1 * | 10/2013 | Hamada | H01H 9/346<br>218/26 |

FOREIGN PATENT DOCUMENTS

| | | | | | |
|---|---|---|---|---|---|
| EP | 2064718 | B1 | | 6/2016 | |
| GB | 2286486 | A | | 8/1995 | |
| KR | 20130089541 | | * | 8/2013 | H01H 9/362 |
| KR | 20130089541 | A | | 8/2013 | |
| KR | 1020180048151 | A | | 5/2018 | |
| KR | 1020180124825 | A | | 11/2018 | |

OTHER PUBLICATIONS

International Search Report for related International Application No. PCT/KR2021/002494; report dated Sep. 10, 2021; (5 pages).

Written Opinion for related International Application No. PCT/KR2021/002494; report dated Sep. 10, 2021; (8 pages).

Supplementary Search Report for related European Application No. 21764421.0; action dated Mar. 13, 2024; (12 pages).

* cited by examiner (a)

(a)

(b)

(a)

(b)

ARC EXTINGUISHING ASSEMBLY

CROSS-REFERENCE TO RELATED APPLICATION

The present application is a National Stage of International Application No. PCT/KR2020/002494 filed on Feb. 26, 2021, which claims priority to and the benefit of Korean Utility Model Application No. 10-2020-0026654, filed on Mar. 3, 2020, the disclosure of which is incorporated herein by reference in its entirety.

FIELD

The present disclosure relates to an arc extinguishing assembly, and more specifically to an arc extinguishing assembly having an arc guide.

BACKGROUND

A circuit breaker is a device that blocks the flow of current when abnormal current such as electrical leakage, short circuit or excessive current occurs in the circuit. Through this, it is possible to prevent an accident that may occur in a circuit or an electronic device connected to the circuit. The circuit breaker is energably installed at a specific position in the circuit such that the current of the circuit passes through the circuit breaker.

A conventional circuit breaker has, as is well known, a stationary contact point and a movable contact point formed so as to be proximate or spaced apart from the stationary contact point.

When a normal current flows, the movable contact point is in contact with the stationary contact point. When the movable contact point and the stationary contact point are in contact and energized with each other, the circuit is connected so as to be energized.

When an abnormal current is generated, the movable contact point is spaced apart from the stationary contact point. When the movable contact point and the stationary contact point are spaced apart, the flow of current in the circuit is cut off.

Immediately after the moving contact point is separated from the stationary contact point, a part of the stationary contact point or the movable contact point is melted, and vaporized metal vapor is generated. The current flowing through the movable contact point and the stationary contact point is converted into an arc flowing through the vapor of the metal, and the arc is extended in an arcuate shape as the movable contact point moves away from the stationary contact point.

The arc is a flow of plasma composed of electrons and ions at high temperature and high pressure.

The generated arc is cooled after undergoing an extinguishing process in the arc extinguishing assembly, and discharged to the outside of the arc extinguishing assembly.

Hereinafter, the arc extinguishing process in a conventional circuit breaker will be described with reference to FIGS. 1 to 2.

Referring to FIG. 1, an arc extinguishing assembly 20 for extinguishing the generated arc is illustrated.

The arc extinguishing assembly 20 includes a plurality of grids 230 that are spaced apart from each other and stacked in a direction away from a stationary contact point (not illustrated), and an exhaust 212 for discharging the extinguished arc (A) is formed on the upper side of the plurality of grids 230.

Referring to FIG. 2, the arc (A) is extended and extinguished by a plurality of grids 230 and arc runners 240.

When the movable contact point (not illustrated) on the lower side of the arc extinguishing assembly 20 is separated from the stationary contact point (not illustrated), the arc (A) is generated as described above. The arc (A) is extended along the movable contact point.

Specifically, metal gas is generated between the movable contact point and the stationary contact point, and the pressure of the portion of the stationary contact point is momentarily increased, and the arc is extended toward the grid 230 and the arc runner 240 by the pressure difference.

The extended arc (A) reaches a plurality of grids 230 and runners 240, and the arc (A) is extended and cooled upward while flowing along the grids 230 and runners 240.

However, referring to FIG. 1, the intervals between the arc guides respectively located on both sides of a path in which the arc is extended are excessively spaced apart.

Therefore, the metal gas which is generated when the stationary contact point is separated from the movable contact point is dispersed, and problems may occur in that the force pushing the arc (A) toward the grid 230 and the arc runner 240 is insufficiently formed.

In addition, the instantaneous pressure rise depends on the voltage of the circuit. That is, when the pressure in the circuit is lowered, the instantaneous amount of increase in the pressure may be lowered. When a sufficient pressure difference is not generated by the lowered voltage, the above-described problems may occur more frequently. In this case, there may be a problem in that arc extinguishing is not sufficiently performed, causing damage to other components of the circuit breaker.

A related art document (Chinese Patent Publication No. 1801418) discloses an arc extinguishing device for extinguishing an arc generated when the circuit is cut off. Specifically, the arc extinguishing device is provided with a grid and an arc runner, and the generated arc is extinguished while extending along the grid and the arc runner.

However, the arc extinguishing device may have a problem in that the arc generating space is excessively wide and the force pushing the arc toward the grid and the arc runner is insufficiently formed.

SUMMARY

An object of the present disclosure is to provide an arc extinguishing assembly having a structure capable of solving the above-described problems.

First, an object of the present disclosure is to provide an arc extinguishing assembly having a structure in which the generated arc can be extended to a grid and a runner.

In addition, another object of the present disclosure is to provide an arc extinguishing assembly having a structure capable of pushing the generated arc toward a runner.

In addition, still another object of the present disclosure is to provide an arc extinguishing assembly having a structure capable of pushing the generated arc toward a grid.

In addition, still another object of the present disclosure is to provide an arc extinguishing assembly having a structure capable of pushing the generated arc toward a runner and a grid.

In addition, still another object of the present disclosure is to provide an arc extinguishing assembly having a structure capable of pushing the generated arc toward a runner and a grid without significantly changing the structure.

In addition, still another object of the present disclosure is to provide an arc extinguishing assembly having a structure in which the generated arc can be extended to a grid and a runner even when the voltage of the circuit is lowered.

The present disclosure provides an arc extinguishing assembly having a configuration that can solve the above problems.

The arc extinguishing assembly according to the present disclosure includes a pair of arc guides having inclined surfaces facing each other.

The inclined surfaces facing each other are formed to be inclined so as to move away from each other as the distance from an arc generation point increases.

The distance between the inclined surfaces facing each other increases as the distance from an arc generation point increases.

The size of the space between the inclined surfaces facing each other increases as the distance from an arc generation point increases.

Accordingly, when an arc is generated, a pressure difference instantaneously occurs in the space between the inclined surfaces facing each other.

The pressure of the part relatively close to the arc generation point is temporarily increased compared to the part relatively farther away.

The arm extinguishing assembly according to an exemplary embodiment of the present disclosure includes a frame having side portions which are spaced apart by a predetermined distance and facing each other and an exhaust connecting between the side portions from one side of the side portion; a grid which is inserted between the side portions, coupled to the frame, formed in a plate shape, provided in plurality and stacked to be spaced apart from each other by a predetermined distance in one direction; and an arc guide which is located on one side of the plurality of grids and extending in the one direction, and respectively coupled to the side portion.

In addition, each of the arc guides has wings protruding toward each other, and the distance between the wings increases toward the one direction.

In addition, the wing is respectively formed with inclined surfaces facing each other, and each of the inclined surfaces is inclined toward an adjacent side portion toward the one direction.

In addition, the wing is respectively formed with inclined surfaces facing each other, and an imaginary extension line extending along an inclination direction of each of the inclined surfaces forms an acute angle with an imaginary center line passing the center between the inclined surfaces in the one direction, respectively.

In addition, the distance between the wings increases toward the exhaust.

In addition, the wing is respectively formed with inclined surfaces facing each other, and each of the inclined surfaces is inclined toward an adjacent side portion toward the one direction and the exhaust.

In addition, the arc guide is spaced apart by a predetermined distance in the one direction from a stationary contact point where an arc is generated.

In addition, the arc extinguishing assembly further includes a runner which is inserted between the side portions and coupled to the frame, and located to be spaced apart by a predetermined distance from the other side opposite to the one side of the plurality of grids, and has one side bent toward the stationary contact point.

In addition, the length of the wing in the one direction is shorter than the distance between the stationary contact point and the bent side of the runner.

In addition, arms are respectively formed on both sides of the grid coupled to the side portion, and the arms are respectively inserted into the arc guide.

In addition, the arc extinguishing assembly according to another exemplary embodiment of the present disclosure includes a frame having side portions spaced apart by a predetermined distance and facing each other and an exhaust connecting between the side portions from one side of the side portion; a grid which is inserted between the side portions, coupled to the frame, formed in a plate shape, provided in plurality and stacked to be spaced apart from each other by a predetermined distance in one direction; and an arc guide which is located on one side of the plurality of grids and extending in the one direction, and respectively coupled to the side portion.

In addition, each of the arc guides has wings protruding toward each other, and the distance between the wings increases toward the exhaust.

In addition, the wing is respectively formed with inclined surfaces facing each other, and an imaginary extension line extending along an inclination direction of each of the inclined surface forms an acute angle with an imaginary center line passing the center between the inclined surfaces toward the exhaust, respectively.

In addition, the wing is respectively formed with inclined surfaces facing each other, and each of the inclined surfaces is inclined toward an adjacent side portion toward the exhaust.

In addition, the distance between the wings increases toward the one direction.

In addition, the wing is respectively formed with inclined surfaces facing each other, and each of the inclined surfaces is inclined toward an adjacent side portion toward the one direction and the exhaust.

In addition, the arc guide is spaced apart by a predetermined distance in the one direction from a stationary contact point where an arc is generated.

In addition, the arc extinguishing assembly further includes a runner which is inserted between the side portions and coupled to the frame, and located to be spaced apart by a predetermined distance from the other side opposite to the one side of the plurality of grids, and has one side bent toward the stationary contact point.

In addition, the length of the wing in the one direction is shorter than the distance between the stationary contact point and the bent side of the runner.

In addition, arms are respectively formed on both sides of the grid coupled to the side portion, and the arms are respectively inserted into the arc guide.

In addition, the arc extinguishing assembly according to still another exemplary embodiment of the present disclosure includes a frame having side portions spaced apart by a predetermined distance and facing each other and an exhaust connecting between the side portions from one side of the side portion; a grid which is inserted between the side portions, coupled to the frame, formed in a plate shape, provided in plurality and stacked to be spaced apart from each other by a predetermined distance in one direction; and an arc guide which is located on one side of the plurality of grids and extending in the one direction, and respectively coupled to the side portion.

In addition, each of the arc guides has wings protruding toward each other, and the distance between the wings increases toward the one direction and the exhaust.

In addition, the wing is respectively formed with inclined surfaces facing each other, and each of the inclined surfaces is inclined toward an adjacent side portion toward the one direction and the exhaust.

In addition, the arc guide is spaced apart by a predetermined distance in the one direction from a stationary contact point where an arc is generated.

In addition, the arc extinguishing assembly further includes a runner which is inserted between the side portions and coupled to the frame, and located to be spaced apart by a predetermined distance from the other side opposite to the one side of the plurality of grids, and has one side bent toward the stationary contact point, and the length of the wing in the one direction is shorter than the distance between the stationary contact point and the bent side of the runner.

In addition, the distance between the two most adjacent points of the wing is formed to be ½ or less of the distance between the side portions.

According to the present disclosure, the following effects are derived.

First, the distance between wings increases as these are adjacent to an arc runner. Accordingly, a temporary pressure difference occurs when an arc is generated. As a result, the generated arc is pushed toward the side of an arc runner where the pressure is relatively low such that the extension speed of an arc in a direction towards the arc runner can be increased, and the arc extinguishing performance can be improved.

In addition, the distance between wings increases as these are adjacent to the exhaust. Accordingly, a temporary pressure difference is generated when an arc is generated. As a result, the generated arc is pushed to the side where the pressure is relatively low. That is, the generated arc is pushed toward a grid such that the extension speed of an arc in a direction toward the grid can be increased, and the arc extinguishing performance can be improved.

In addition, the distance between wings increases as these are adjacent to the arc runner and the exhaust. Accordingly, a temporary pressure difference occurs when an arc is generated. As a result, the generated arc is pushed to the side where the pressure is relatively low. That is, the generated arc is pushed toward the grid and arc runner such that the extension speed of an arc in a direction toward the grid and arc runner can be increased, and the arc extinguishing performance can be improved.

In addition, the arc extinguishing performance can be improved by changing the shape of the arc grid without significantly changing the structure of the arc extinguishing assembly.

Figure 1:
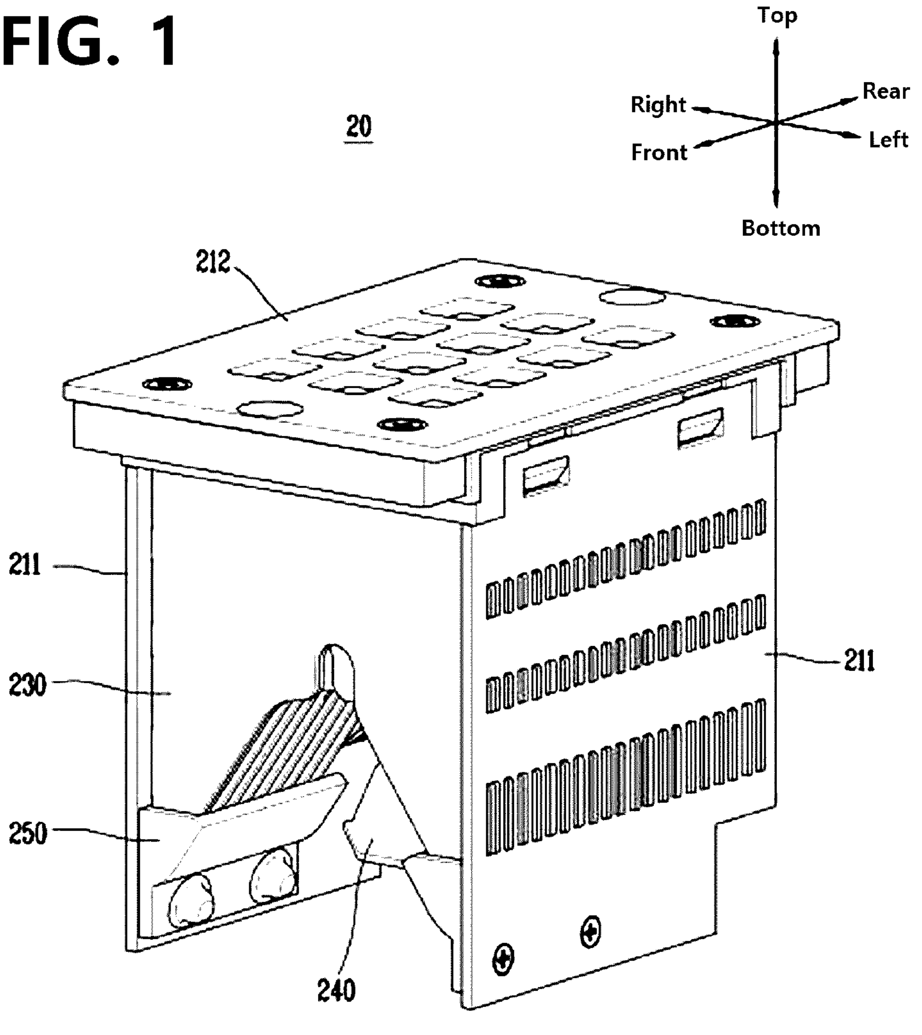
FIG. 1 is a perspective view illustrating a conventional arc extinguishing assembly.
Figure 2:
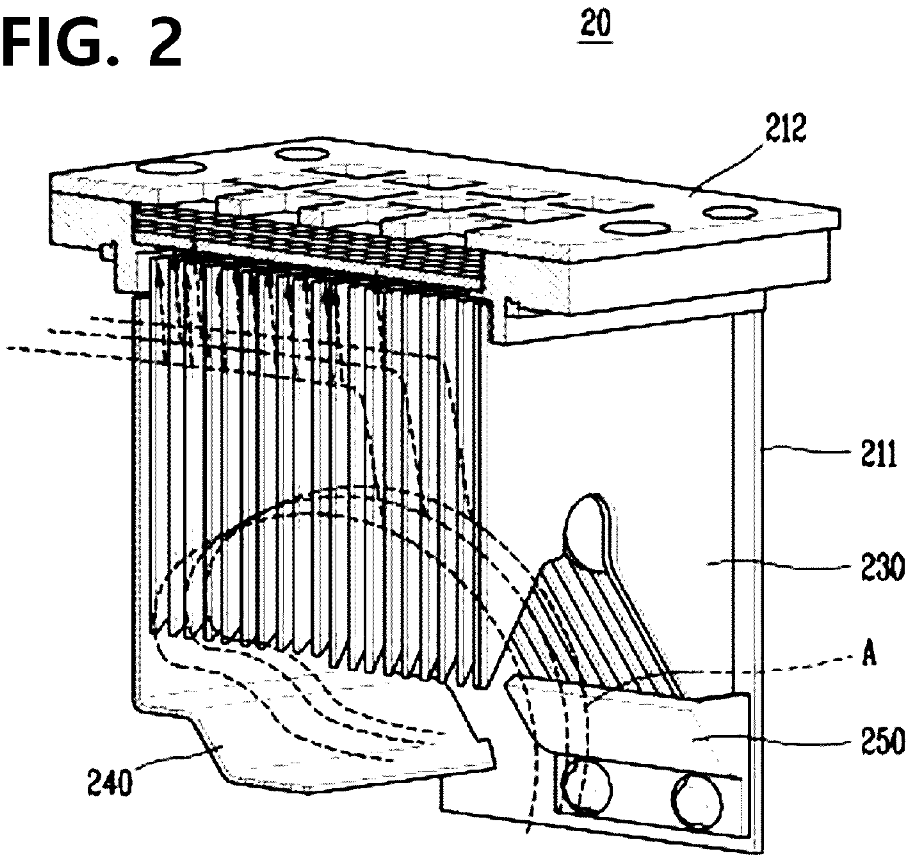
FIG. 2 is a cross-sectional perspective view illustrating a path in which an arc is extended in the arc extinguishing assembly of FIG. 1.

| <Explanation of Reference Numerals> | |
|---|---|
| 10: | Circuit breaker |
| 11: | Circuit breaker body |
| 11a: | Accommodation space |
| 12a: | Power side connection |
| 12b: | Load side connection |
| 13: | Movable contact |
| 13a: | Movable contact point |
| 14: | Stationary contact |
| 14a: | Stationary contact point |
| 100: | Arc extinguishing assembly |
| 110: | Frame |
| 111: | Side portion |
| 1111: | Snap fastening hole |
| 1113: | Screw fastening hole |
| 1115: | Grid fastening hole |
| 1117: | Arc runner fastening hole |
| 1119: | Arc guide fastening hole |
| 112: | Exhaust |
| 1121: | Exhaust body |
| 1121a: | Snap protrusion |
| 1121b: | Screw fastening groove |
| 1123: | Insulation plate |
| 1125: | Filter |
| 1127: | Exhaust cover |
| 130: | Grid |
| 131: | Grid body |
| 133: | Grid arm |
| 135: | Grid fastening protrusion |
| 140: | Arc runner |
| 141: | Arc runner fastening protrusion |
| 150: | Arc guide |
| 151: | Wing |
| 151a: | Arm receiving groove |
| 151b: | Inclined surface |
| 153: | Extension |
| 155: | Fastening portion |
| 155a: | Fastening portion fastening hole |
| 163: | Arc guide fastening member |
| 250: | Arc guide |
| 251: | Wing |
| 251a: | Arm receiving groove |
| 251b: | Inclined surface |
| 253: | Extension |
| 255: | Fastening portion |
| 255a: | Fastening portion fastening hole |
| 350: | Arc guide |
| 351: | Wing |
| 351a: | Arm receiving groove |

-continued

| <Explanation of Reference Numerals> | |
|---|---|
| 351b: | Inclined surface |
| 353: | Extension |
| 355: | Fastening portion |
| 355a: | Fastening portion fastening hole |

DETAILED DESCRIPTION

Hereinafter, the arc extinguishing assembly according to an exemplary embodiment of the present disclosure will be described in detail with reference to the accompanying drawings.

In the following description, the descriptions of some components may be omitted in order to clarify the characteristics of the present disclosure.

First, the terms used below are defined.

1. Definitions of Terms

The term 'circuit breaker' used below means a device that is connected to a circuit to detect a situation in which a leakage current or overcurrent flows or a short circuit occurs in the circuit, and blocks the flow of current in the circuit when such a situation occurs. In an exemplary embodiment, the circuit breaker may be provided as an air circuit breaker.

The term 'normal current' used below means a current in a state where the circuit breaker does not perform a blocking operation. Specifically, it means a current flowing within a preset current range value in the breaker, a current in a state where current leakage does not occur, or a current in a state where a short circuit does not occur.

The term 'abnormal current' used below means a current in a state where the circuit breaker performs a blocking operation. Specifically, it means a current exceeding a preset current range value in the breaker, a current in a state where current leakage occurs, or a current in a state where a short circuit occurs.

The term 'arc' used below means a plasma of electrons and ions generated when a movable contact point and a stationary contact point in a state where current flows through contact with each other are spaced apart.

The terms 'front side', 'rear side', 'left', 'right', 'top' and 'bottom' used below may be understood with reference to the coordinate system illustrated in FIG. 3.

2. Description of the Configuration of the Circuit Breaker According to an Exemplary Embodiment of the Present Disclosure Hereinafter, the configuration of a circuit breaker according to an exemplary embodiment of the present disclosure will be described with reference to FIGS. 3 and 4.

Figure 3:
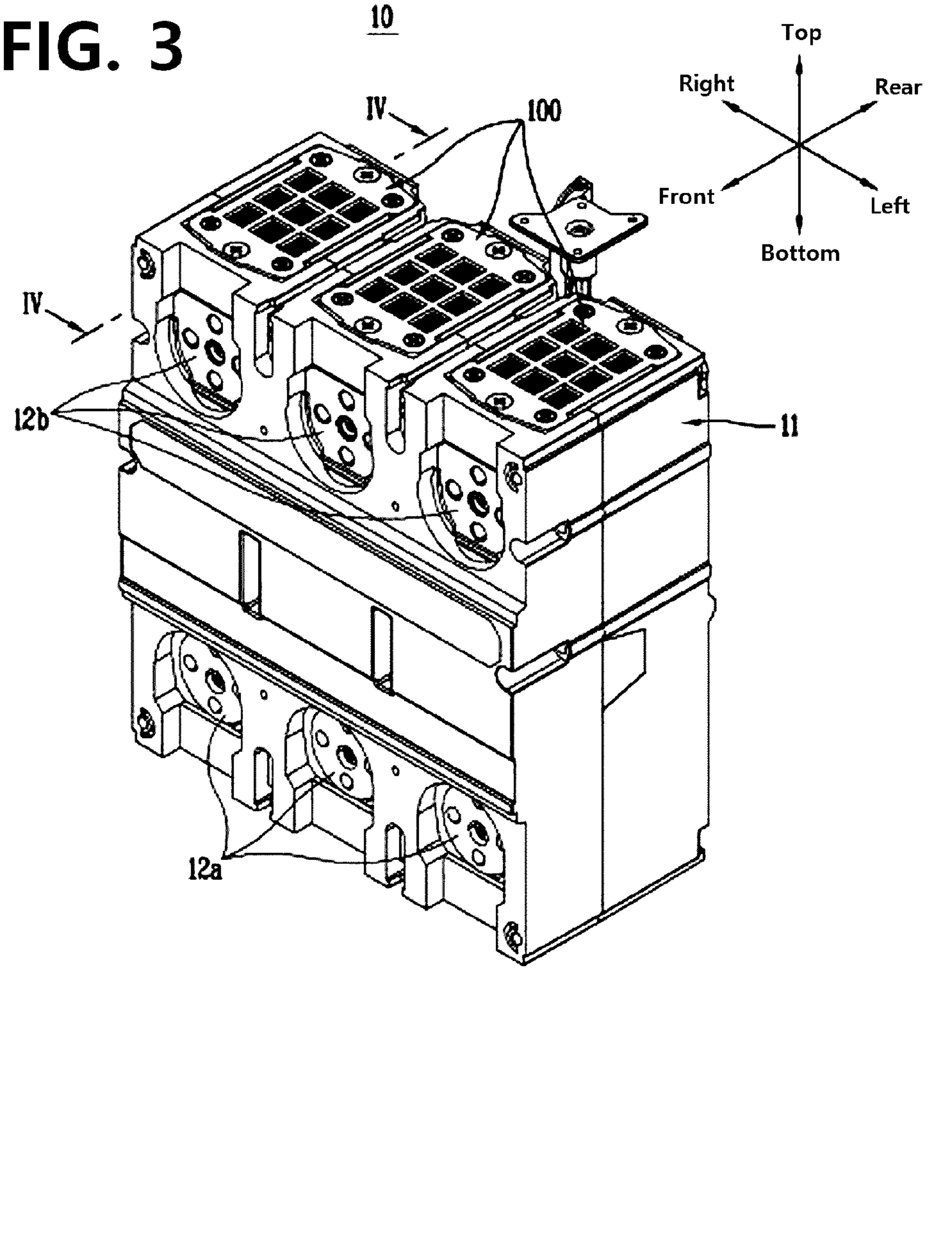
FIG. 3 is a perspective view of the circuit breaker according to an exemplary embodiment of the present disclosure.
Figure 4:
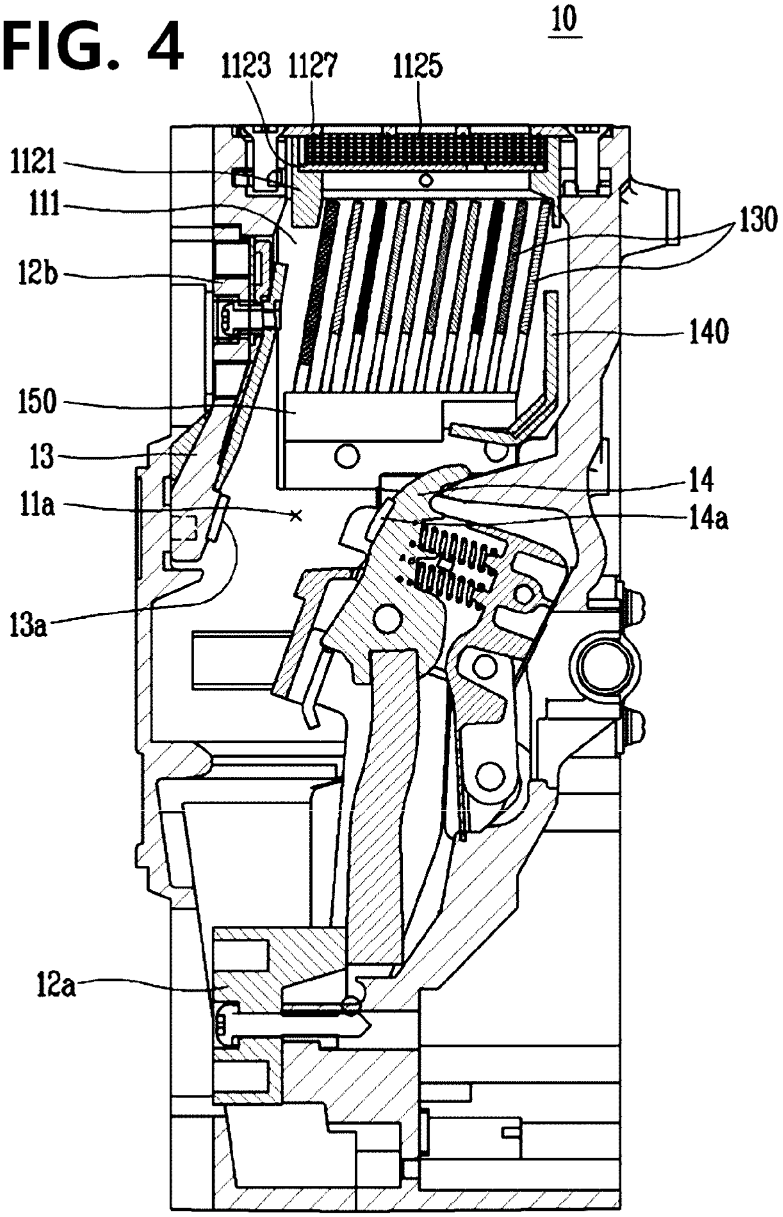
FIG. 4 is a cross-sectional view of the circuit breaker of FIG. 3.

Referring to FIGS. 3 and 4, a circuit breaker 10 configured to block the flow of current when an abnormal current occurs is illustrated.

The circuit breaker 10 includes a circuit breaker body 11 having an upwardly open accommodation space 11*a* (refer to FIG. 4) therein. On the front side of the circuit breaker body 11, a power side connection 12*a* connected to the side of a power supply and a load side connection 12*b* connected to the side of a load to be energized are formed.

Referring to FIG. 4, a stationary contact 13 and a movable contact 14 configured to block or energize the power side connection 12*a* and the load side connection 12*b* are provided in the accommodation space 11*a* of the circuit breaker body 11.

The stationary contact point 13 is provided with a stationary contact point 13*a*, and the movable contact point 14 is provided with a movable contact point 14*a*. When a normal current flows in the circuit, the stationary contact point 13*a* and the movable contact point 14*a* come into contact with each other, and a current flows between the power side connection 12*a* and the load side connection 12*b*.

When an abnormal current flows in the circuit, the movable contact 14 is rotated by a predetermined angle in a direction away from the stationary contact 13. Accordingly, the stationary contact point 13*a* and the movable contact point 14*a* are spaced apart from each other, and the flow of current between the power side connection part 12*a* and the load side connection part 12*b* is blocked.

Since the structure in which the movable contact 14 is rotated and spaced apart from the stationary contact 13 is a known technique, the description of the structure will be omitted.

When the movable contact point 14*a* and the stationary contact point 13*a* are spaced apart, an arc is generated between the movable contact point 14*a* and the stationary contact point 13*a*. In this case, the arc is a plasma of high-temperature electrons and ions, and if it is not extinguished quickly, damage to the components constituting the circuit breaker may occur. Accordingly, an arc extinguishing assembly 100 for extinguishing the arc is provided above the stationary contact point 13*a* and the movable contact point 14*a*.

The arc extinguishing assembly 100 is inserted into the open side of the accommodation space 11*a* of the circuit breaker body 11 to cover the open portion of the accommodation space 11*a*.

After the generated arc is extinguished in the arc extinguishing assembly 100, it is discharged to the outside of the circuit breaker 10 through the exhaust 112 of the arc extinguishing assembly 100. The arc is extended as the arc flows along a grid 130 and an arc runner 140 of the arc extinguishing assembly 100. Accordingly, in order to extinguish the arc quickly, it is desirable to move the arc rapidly toward the grid 130 and/or arc runner 140.

3. Description of the Arc Extinguishing Assembly According to an Exemplary Embodiment of the Present Disclosure Hereinafter, the arc extinguishing assembly 100 according to an exemplary embodiment of the present disclosure will be described with reference to FIGS. 5 and 6.

Figure 5:
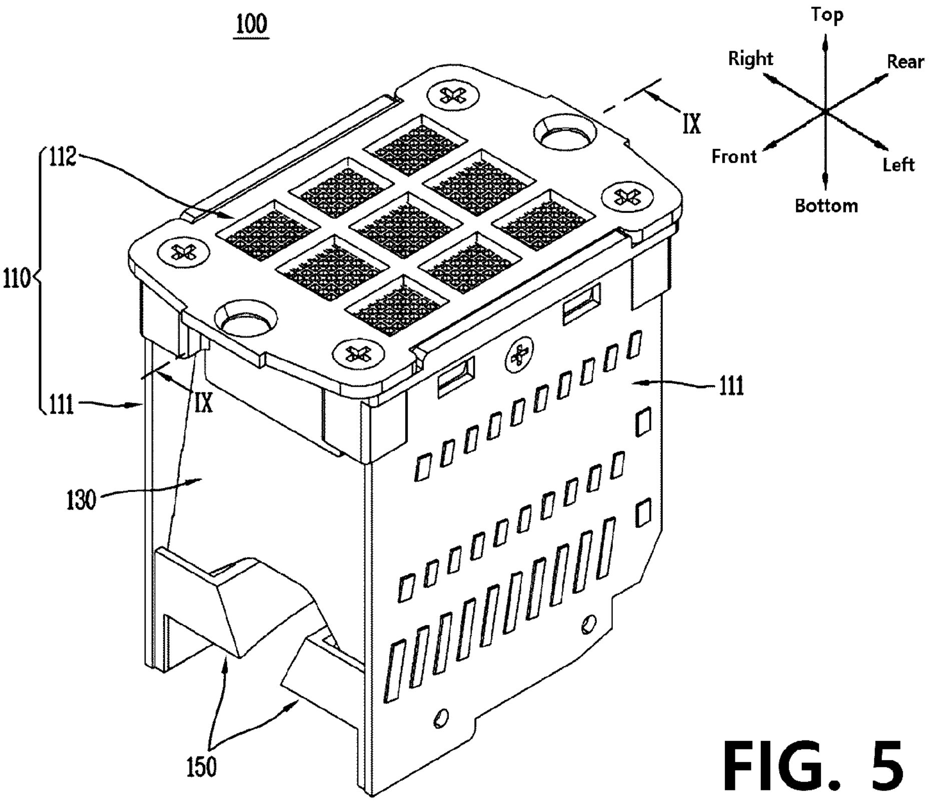
FIG. 5 is a perspective view of the arc extinguishing assembly according to an exemplary embodiment of the present disclosure.
Figure 6:
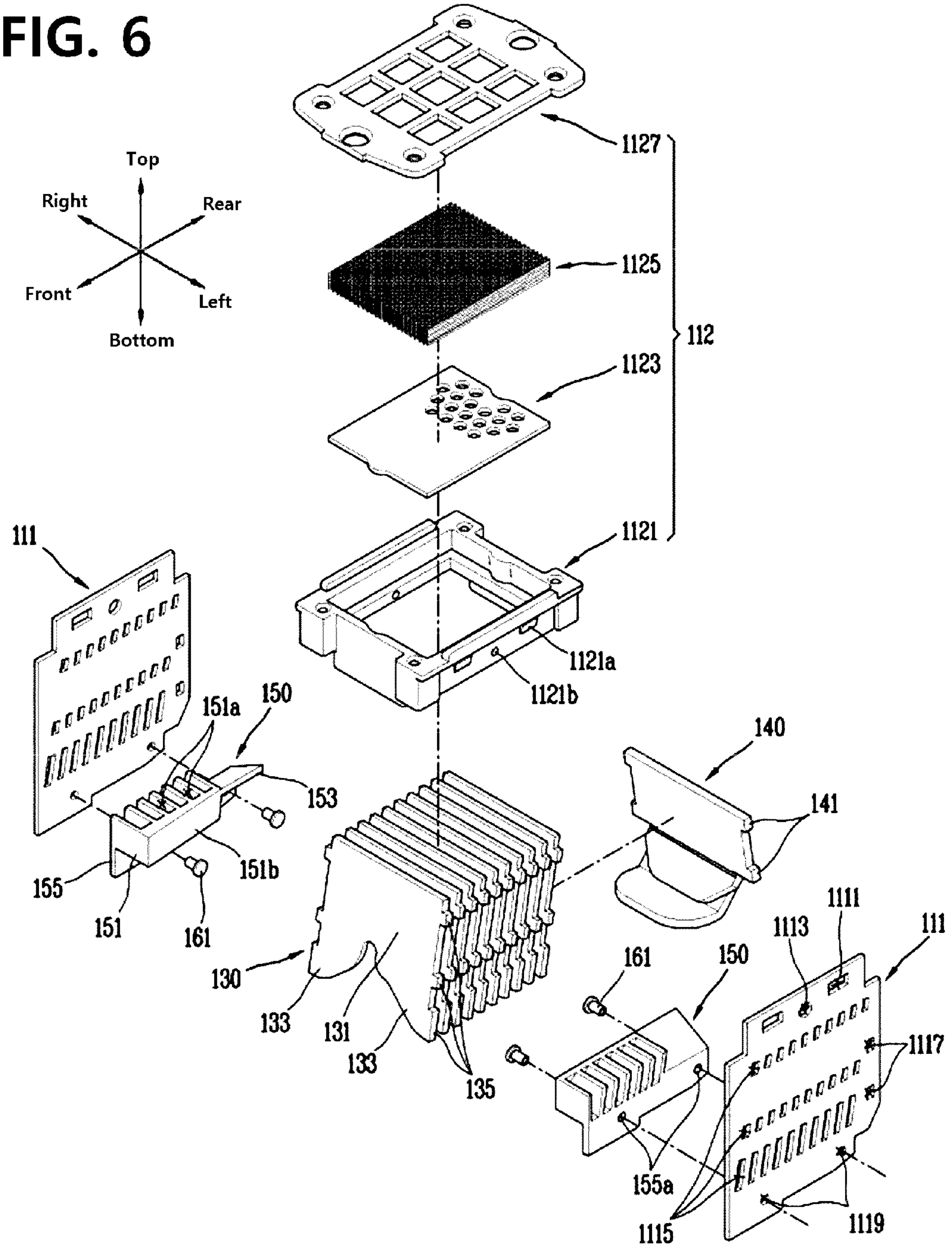
FIG. 6 is an exploded perspective view of the arc extinguishing assembly according to FIG. 5.

Referring to FIGS. 5 and 6, the arc extinguishing assembly 100 is illustrated in a combined state and an exploded state.

The arc extinguishing assembly 100 is accommodated in the accommodation space 11*a* of the circuit breaker 10, and is located adjacent to the upper side of the stationary contact point 13*a* and the movable contact point 14*a*. The arc is generated from the lower side of the arc extinguishing assembly 100, and after undergoing an extinguishing process in the arc extinguishing assembly 100, the arc is discharged to the outside of the circuit breaker 10 through the exhaust 112 of the arc extinguishing assembly 100. The arc extinguishing assembly 100 includes a frame 110, a grid 130, an arc runner 140 and an arc guide 150.

The frame 110 includes an exhaust 112 and a pair of side portions 111 coupled to the exhaust portion 112.

(1) Description of the Exhaust 112

First, the exhaust 112 will be described.

The exhaust 112 includes an exhaust housing 1121, an insulation plate 1123, a filter 1125 and an exhaust cover 1127.

A pair of side portions 111 to be described below are respectively coupled to the left and right sides of the exhaust housing 1121. In the central portion of the upper surface of the exhaust housing 1121, an accommodation portion (not assigned) in which the insulation plate 1123 and the filter 1125 are accommodated is formed to be recessed, and a plurality of exhaust holes (not assigned) are formed to pass through the insulation plate 1123.

An exhaust cover 1127 is coupled to an upper surface of the exhaust housing 1121, and a plurality of gas outlets (not assigned) are formed through a central portion of the exhaust cover 1127.

As described above, the exhaust hole, the insulation plate 1123, the filter 1125 and the gas outlet are sequentially located from the lower side to the upper side in the exhaust 112. For this reason, the metal gas introduced into the exhaust hole passes through the insulation plate 1123 and the filter 1125 and then is discharged to the outside of the circuit breaker 10 through the gas outlet. That is, the exhaust 112 functions as a passage through which the metal gas is discharged to the outside of the circuit breaker 10.

In addition, the arc extinguishing assembly 100 is coupled to a circuit breaker body 11 through the exhaust 112. The process in which the exhaust is coupled to the circuit breaker housing is as follows.

Fastening holes (not assigned) are respectively formed through the front side and the rear side of the exhaust cover 1127. In a state where the exhaust cover 1127 covers the opening of the accommodation space 11*a* of the circuit breaker 10, a fastening member (not illustrated) passes through the fastening hole and is coupled to the circuit breaker body 11. Accordingly, the arc extinguishing assembly 100 is coupled to the circuit breaker body 11.

In addition, the exhaust 112 functions as a pressure increasing means inside the arc extinguishing assembly 100. Specifically, since the exhaust 112 covers the open portion of the accommodation space 11*a*, the pressure inside the arc extinguishing assembly 100 may momentarily increase when the metal gas is generated. Accordingly, a temporary pressure difference between the pressure inside the arc extinguishing assembly 100 and the outside of the circuit breaker 10 is generated, and the metal gas may be moved toward the exhaust hole of the exhaust 112.

(2) Description of the Side Portion 111

Next, the side portion 111 will be described.

The side portion 111 is provided in a pair and is formed in a plate shape.

The side portions 111 are located to face each other, and a grid 130 and an arc runner 140 to be described below are disposed between the side portions 111 and are coupled to the side portions 111.

A plurality of grid fastening holes 1115 and arc runner fastening holes 1117 are formed through the central portion of the side portion 111. A grid fastening protrusion 135 and an arc runner fastening protrusion 141, which will be described below, are respectively inserted into the grid fastening hole 1115 and the arc runner fastening hole 1117.

Herein, the grid fastening hole 1115 and the arc runner fastening hole 1117 are formed to have sizes corresponding to the grid fastening protrusion 135 and the arc runner fastening protrusion 141 or slightly smaller sizes. Accordingly, the grid fastening protrusion 141 and the arc runner fastening protrusion 135 are press-fitted into the grid fastening hole 1115 and the arc runner fastening hole 1117, and the side portion 111, the grid 130 and the arc runner 140 may be coupled.

In the illustrated exemplary embodiment, the grid fastening hole 1115 and the arc runner fastening hole 1117 are formed in rectangular shapes, but these may vary depending on the shapes of the grid fastening protrusion 135 and the arc runner fastening protrusion 141.

In addition, an arc guide 150 to be described below is coupled to each side portion 111, respectively. An arc guide fastening hole 1119 for coupling with the arc guide 150 is formed through the lower side of the side portion 111. The arc guide fastening hole 1119 may be formed in plurality.

The arc guide fastening member 161 passes through the arc guide 150 and is coupled to the arc guide fastening hole 1119. The arc guide 150 is coupled to the side portion 111 by the fastening force of the arc guide fastening member 161 and the arc guide fastening hole 1119.

In an exemplary embodiment, the arc guide fastening member 161 may be composed of a bolt and a nut. In addition, in an exemplary embodiment, the arc guide fastening member may be composed of a rivet.

At the upper side of the side portion 111, an exhaust 112, which will be described below, is coupled between the side portions 111.

A snap fastening hole 1111 and a screw fastening hole 1113 for coupling with the exhaust 112 are formed to pass through the upper side of the side portion 111.

In addition, a snap protrusion 1121*a* and a screw coupling groove 1121*b* for coupling with the side portion 111 are formed in the exhaust housing 1121 provided in the exhaust 112.

A pair of side portions 111 are slidably moved to the left and right side surfaces of the exhaust 112 in order to be coupled to the exhaust 112. When the side portion 111 is moved, the snap protrusions 1121*a* protruding from the left and right sides of the exhaust housing 1121 are inserted into and coupled to the snap fastening holes 1111.

Herein, the snap protrusion 1121*a* is formed to be inclined in the insertion direction of the side portion 111. Accordingly, insertion of the snap protrusion 1121*a* into the snap fastening hole 1111 becomes easy. Further, in a state where the snap protrusion 1121*a* is inserted into the snap fastening hole 1111, the side portion 111 is not arbitrarily moved to the lower side of the exhaust housing 1121.

In the illustrated exemplary embodiment, the snap fastening hole 1111 is formed in a rectangular shape, but this may vary depending on the shape of the snap protrusion 1121*a*.

In addition, in a state where the side portion 111 is coupled to the exhaust housing 1121, a fastening screw (not illustrated) passes through the screw fastening hole 1113 and is coupled to the screw fastening groove 1121*b*. Accordingly, the exhaust 112 and the side portion 111 may be more firmly coupled.

(3) Description of the Grid 130 and the Arc Runner 140

Next, the grid 130 will be described.

The grid 130 is formed in a plate shape, and a plurality of grids are stacked by being spaced apart from each other by a predetermined distance in one direction away from the stationary contact point. Specifically, a plurality of grids 130 are stacked to be spaced apart from each other by a predetermined distance from the front side to the rear side.

The grid 130 includes a grid body 131 and arms 133 extending downward from both sides of the grid body portion 131, respectively. Specifically, the arm 133 extends downward from the left and right sides of the grid body 131. The lower ends of the arm 133 are respectively inserted into the arm accommodating grooves 151*a* of the arc guide 150 to be described below.

Since the lower end of the arm 133 is surrounded by the arm accommodating groove 151*a*, the arc may be moved upward without being moved to the arm 133 and staying therein.

In addition, on both sides of the grid 130, specifically, on the left and right sides, the grid fastening protrusions 135 are formed to protrude. The grid fastening protrusions 135 protruding from both sides are inserted into the grid fastening holes 1115, whereby the grid 130 may be stationary between the pair of side surfaces.

The grid 130 may be formed of any material capable of applying electromagnetic attraction to the arc. In an exemplary embodiment, the grid 130 may be formed of an iron (Fe) material.

The arc is extended and moved between the plurality of grids 130. Accordingly, the arc voltage is increased and the arc is cooled.

Next, the arc runner 140 will be described.

The arc runner 140 is formed in a plate shape, and is located to be spaced apart from the plurality of grids 130 by a predetermined distance to the rear side.

The arc extends to the lower end of the arc runner 140 and flows along the arc runner 140. If the arc does not reach the arc runner 140, the arc extinguishing performance may be reduced. In consideration of this point, it is preferable to shorten the distance between the arc generation position and the arc runner 140.

To this end, the lower end of the arc runner 140 is bent toward the stationary contact point 13*a*. The bent lower end is located below the grid 130 which is located on the rear side among the plurality of grids 130. The distance between the lower end of the arc runner 140 and the stationary contact point 13*a* is shortened by the bent structure of the arc runner 140.

The arc runner 140 may be formed of any material capable of applying electromagnetic attraction to the arc. In an exemplary embodiment, the arc runner may be formed of an iron (Fe) material.

(4) Description of the Arc Guide 150

Next, the arc guide 150 will be described.

The arc guide 150 is provided as a pair and is respectively coupled to the pair of side portions 111 from the lower side of the grid 130.

The arc guide 150 is formed of an insulating material and extends along the stacking direction of the grid 130. That is, the arc guide 150 extends in a direction away from the stationary contact point 13*a*.

The arc guide 150 includes a wing 151, an extension 153 and a fastening portion 155.

The wing 151 is formed to extend from the lower side of the grid 130 located at the frontmost side to the rear side. The extension 153 is formed to extend from the wing 151 to the lower side of the grid located on the rearmost side. The fastening portion 155 is formed to extend downward from the wing 151 and the extension 153.

The wing 151 and the extension 153 accommodate the arms 133 of the grid 130 to suppress a decrease in arc extinguishing efficiency.

Specifically, the arm receiving groove 151*a* opened toward the upper side and the side portion 111 is formed in the wing 151 and the extension 153 along the stacking direction of the grid 130. The opening which faces the side portion 111 is blocked due to coupling with the side portion 111, and the lower end of the arm 133 is inserted into the upper opening of the arm receiving groove 151*a*.

The arm accommodating groove 151*a* may be formed by being divided into a plurality such that the arms 133 can be individually inserted, and may be integrally formed such that the plurality of arm 133 can be inserted.

In an exemplary embodiment, the arm accommodating groove 151*a* formed in the wing 151 is formed by being divided into a plurality, and the arm accommodating groove formed in the extension 153 is integrally formed.

The lower end of the inserted arm 133 is surrounded by the arc guide 150 which is an insulating material, thereby preventing the generated arc from moving to the arm 133 and reducing the arc extinguishing efficiency.

The pair of wings 151 are formed to protrude toward each other to reduce the size of the space formed between the wing parts 151. Accordingly, it is possible to suppress the dispersion of metal gas generated in the stationary contact point when an abnormal current is generated. That is, the dispersion of metal gas generated adjacent to the front side and the lower side of the wing 151 may be suppressed.

In addition, the pair of wings 151 may be formed such that the distance therebetween increases from the front side to the rear side. Accordingly, the size of the space between the pair of wings 151 increases from the front side to the rear side.

In an exemplary embodiment, the pair of wings 151 respectively have inclined surfaces facing each other, and each of the inclined surfaces is formed to be inclined toward an adjacent side portion from the front side to the rear side.

In an exemplary embodiment, the pair of wings 151 have a rectangular cross-sectional shape, and the left and right lengths of the rectangular cross-section are decreased from the front side toward the rear side. As a result, the size of the space between the two inclined surfaces increases from the front side to the rear side, and when the metal gas is generated at the stationary contact point, a pressure difference between the front side and the rear side occurs.

In addition, the metal gas is pushed to the rear side by the pressure difference. Accordingly, the extension length and extension speed of the arc from the front side to the rear side may be increased. In this regard, it will be described in detail below.

The fastening portion functions to couple the arc guide 150 and the side portion.

Specifically, the fastening portion 155 extends from the lower side of the wing 151 and the extension 153, and a fastening portion fastening hole 155*a* is formed to pass through the fastening portion 155 at a position corresponding to the arc guide fastening hole 1119.

When the fastening portion 155 and the side portion 111 are in contact with each other such that the arc guide fastening hole 1119 and the fastening portion fastening hole 155*a* are aligned, the arc guide fastening member 161 passes through the fastening portion fastening hole 155*a* and the arc guide fastening hole 1119. Accordingly, the arc guide 150 may be coupled to the side portion 111.

Herein, it is preferable that a portion of the arc guide fastening member 161 exposed toward the arc guide has insulation. Accordingly, it is possible to suppress the arc from moving through the arc guide fastening member 161.

(5) Description of the Distance Between the Arc Guides 150 and the Inclined Surface of the Arc Guide 150

Hereinafter, the distance between the arc guides 150 and the shape of the inclined surface 151*b* of the arc guide 150 according to the present exemplary embodiment will be described in detail with reference to FIGS. 7 to 9.

Figure 7:
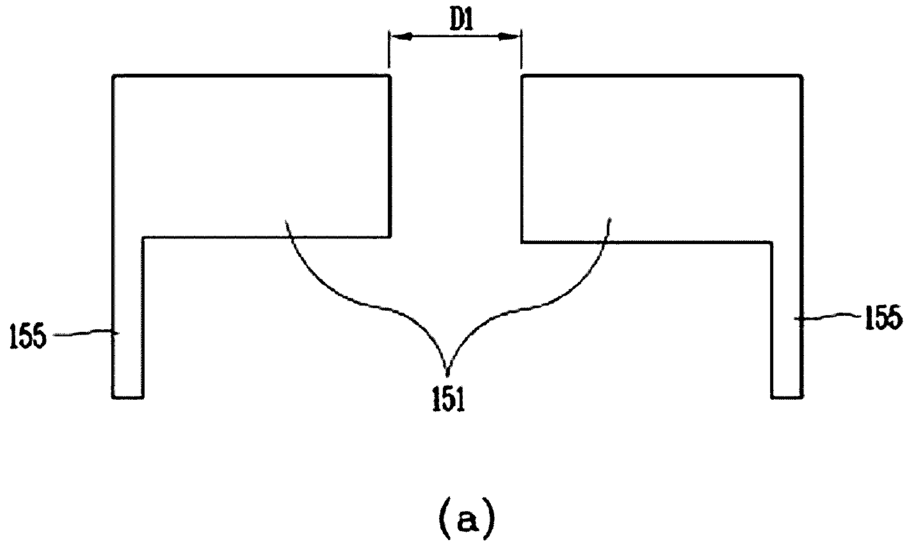
FIG. 7 is a front view and a rear view of the arc guide of FIG. 6.
Figure 7:
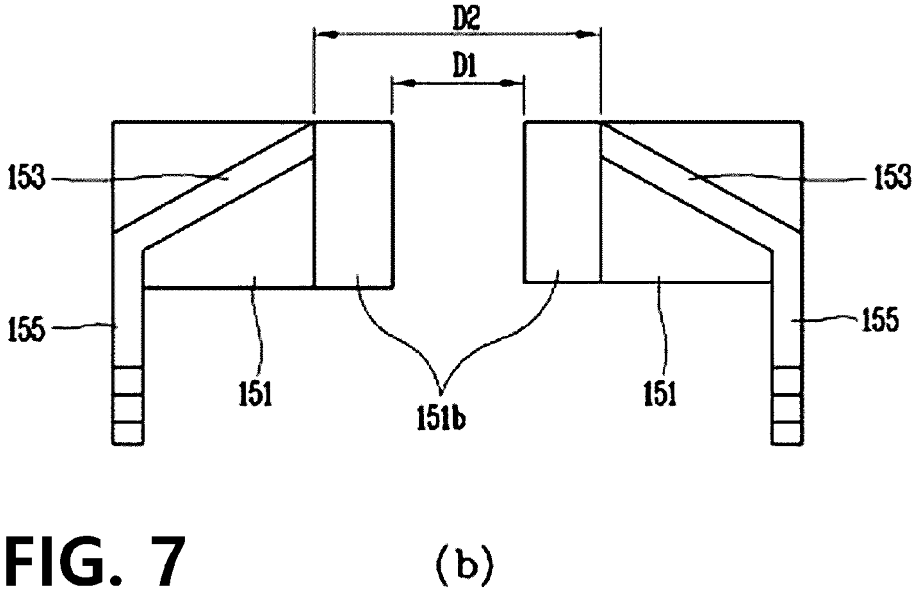

FIG. 7 is a front view and a rear view of the arc guide of FIG. 6. FIG. 8 is a plan view and a bottom view of the arc guide of FIG. 6. FIG. 9 is a cross-sectional view of the arc extinguishing assembly of FIG. 5.

The front end of the wing 151 is illustrated in (a) of FIG. 7, and the rear end of the wing 151 is illustrated in (b) of FIG. 7.

The stationary contact point 13*a* is located below the front end of the wing 151. When an abnormal current is sensed and the movable contact point 14*a* is separated from the stationary contact point 13*a*, metal gas is instantaneously generated, and an arc flows through the generated metal gas.

When the metal gas is generated, the pressure of a portion where the metal gas is generated is momentarily increased, and as a result, the metal gas is raised toward the exhaust 112 of the arc extinguishing assembly 100 by a pressure difference. Accordingly, the arc flowing through the metal gas is raised and extended in an arcuate shape.

Herein, the arc passes through the space between the arc guides 150 and moves to the grid 130 and the arc runner 140, and undergoes an extinguishing process in the grid 130 and the arc runner 140 and is discharged to the outside of the circuit breaker 10.

Meanwhile, as described above, the arc is a flow of high-temperature and high-pressure electrons and is preferably discharged to the outside of the circuit breaker 10 within a short period of time. For this, it is preferable that the generated arc is rapidly extended from the stationary contact point 13*a* to the arc runner 140 located farthest away. In addition, it is preferable that the generated arc rapidly extends from the stationary contact point 13*a* toward the exhaust 112.

Since each wing 151 of a pair of arc guides 150 according to the present exemplary embodiment protrudes toward each other, the size of the space between the wings 151 is reduced. Accordingly, the metal gas generated at the stationary contact point 13*a* may be suppressed from being dispersed between the wings 151. As a result, the arc may be suppressed from being dispersed between the wings 151, and the generated arc may be rapidly extended toward the grid 130 in the space between the wings 151.

In addition, the pair of wings 151 respectively have inclined surfaces 151*b* facing each other. The specific shape of the inclined surfaces 151*b* is as follows.

That is, the front end and the rear end of the pair of wings 151 are respectively connected by inclined surfaces 151*b*, and the distance (D1) between the front ends of the pair of wing parts 151 is formed to be smaller than the distance (D2) between the rear ends. Accordingly, the distance between the inclined surfaces 151*b* of the pair of wings 151 increases from the front side toward the rear side.

That is, the size of the space between the inclined surfaces 151*b* of the pair of wing parts 151 increases from the front side to the rear side. In other words, the size of the space between the inclined surfaces 151*b* of the pair of wings 151 increases as the distance from the stationary contact point 13*a* in the stacking direction of the grid 130 increases. As a result, a temporary pressure difference occurs between the space between the front ends of the wing unit 151 and the space between the rear ends when the arc is generated.

The metal gas is pushed from between the front ends of the wing 151 having a relatively high pressure to between the rear ends having a relatively low pressure. That is, the arc is pushed from between the front ends to between the rear ends of the wing 151 by the pressure difference.

The arc may be rapidly extended toward the arc runner 140 by the structure of the wings 151 as described above.

Specifically, the metal gas is pushed from between the front ends of the wing 151 to between the rear ends. In other words, the metal gas is pushed in a direction away from the stationary contact point along the stacking direction of the grid. That is, the metal gas is pushed in a direction toward the arc runner. Accordingly, the arc may be rapidly extended to the arc runner located on the rear side of the wing 151. As a result, the extension distance of the arc in the stacking direction of the grid 130 may be increased.

In other words, since the arc is pushed toward the arc runner 140 by a temporary pressure difference in the space between the wings 151, the arc may be rapidly extended to the arc runner 140. Referring to FIG. 9, the direction in which the arc is pushed by the temporary pressure difference in the arc guide 150 is illustrated.

When the voltage of the circuit is lowered, an instantaneous pressure increase occurs when the stationary contact point 13*a* and the movable contact point 14*a* are spaced apart may be relatively reduced. Accordingly, the arc does not reach the arc runner 140 such that the arc extinguishing performance may be reduced.

However, when the arc guide 150 having the above-described structure is used, a decrease in the amount of pressure increase due to a decrease in the voltage of the circuit may be compensated. Accordingly, even when the voltage of the circuit is lowered, the arc may smoothly extend to the arc runner 140.

Hereinafter, the inclined surfaces 151*b* of the arc guide 150 according to the present exemplary embodiment will be described in detail.

Figure 8:
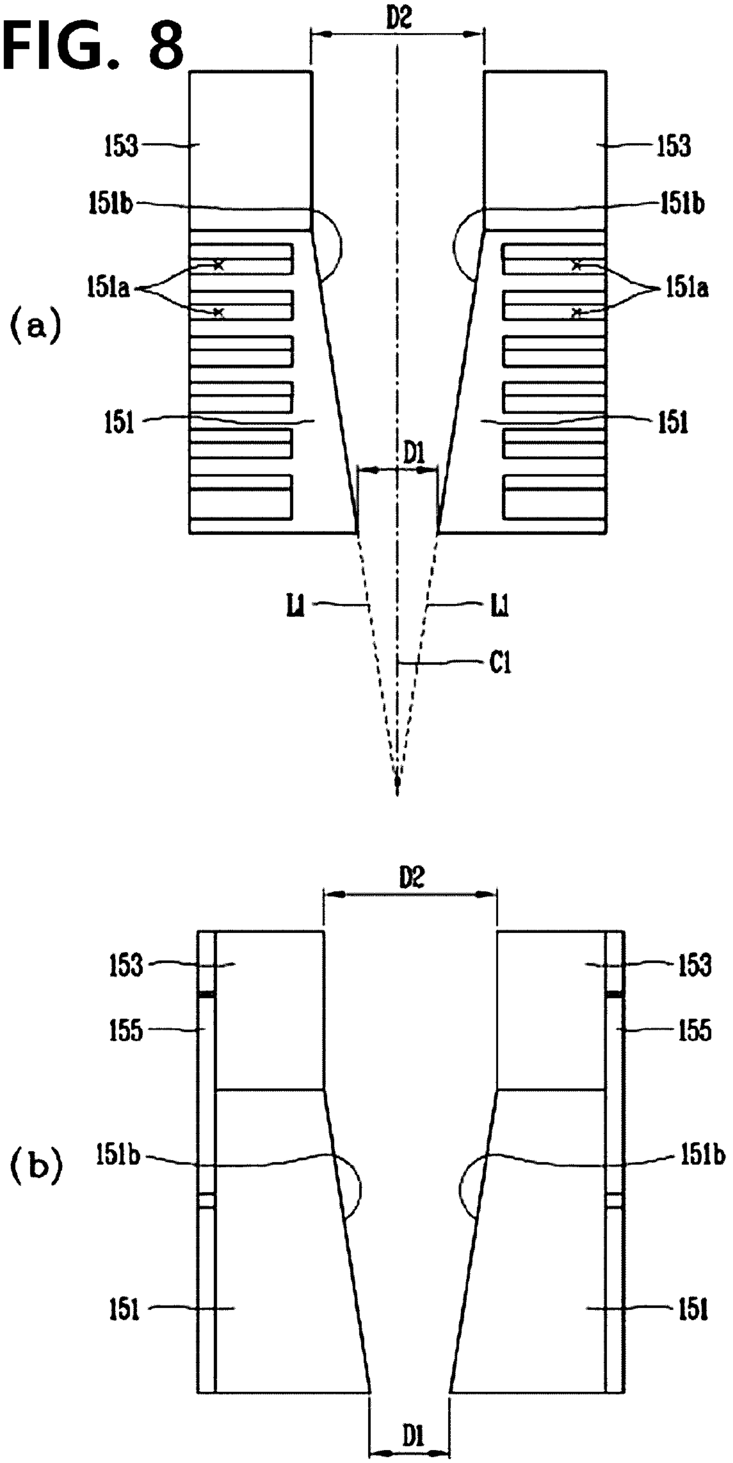
FIG. 8 is a plan view and a bottom view of the arc guide of FIG. 6.
Figure 9:
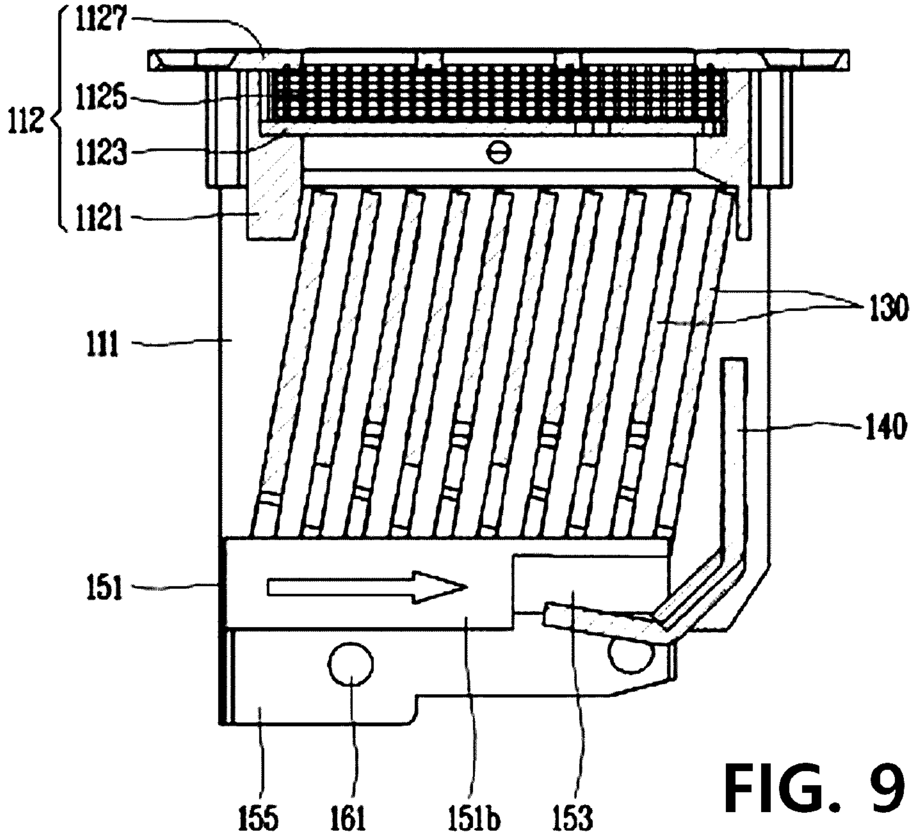
FIG. 9 is a cross-sectional view of the arc extinguishing assembly of FIG. 5.

The upper side surface of the wing 151 is illustrated in (a) of FIG. 8, and the lower side surface of the wing 151 is illustrated in (b) of FIG. 8(*b*).

The inclined surfaces 151*b* of the wing 151 are inclined toward the adjacent side portion 111 as they move away from the stationary contact point 13*a* along the stacking direction of the grid 130. In other words, the inclined surfaces 151*b* of the wing 151 are inclined toward the adjacent side portion 111 from the front to the rear.

Referring to FIG. 8, an imaginary extension line (L1) extending along the inclination direction of each of the inclined surfaces 151*b* is illustrated, and a virtual center line (C1) that passes along the stacking direction of the grid 130 through the center between the two inclined surfaces 151*b* is illustrated. Herein, each extension line (L1) forms an acute angle with the center line (C1).

Due to the structure of the inclined surfaces 151*b* described above, the distance between the inclined surfaces 151*b* of the pair of wing parts 151 increases from the front side to the rear side. That is, the size of the space between the inclined surfaces 151*b* of the pair of wing parts 151 increases from the front side to the rear side.

As a result, when an arc is generated, a pressure difference occurs between the space between the front ends of the wing 151 and the space between the rear ends. As a result, when an arc is generated, the pressure in the space between the wings 151 is decreased from the front side to the rear side. In addition, when an arc is generated, the fluid between the wings 151 flows from the front side having a relatively high pressure to the rear side having a relatively low pressure.

That is, the metal gas is pushed from between the front ends to between the rear ends of the wing 151 by the pressure difference. That is, the arc is pushed from between the front ends to between the rear ends of the wing 151 by the pressure difference.

Since the description of the effect by this structure is described above, it will be replaced therewith.

Since the above-described inclined structure of the wing 151 is a structure for pushing the arc to the lower end of the arc runner 140, the length of the wing 151 in the front-rear direction is preferably formed to be smaller than the distance between the stationary contact point 13*a* and the lower end of the arc runner 140.

In an exemplary embodiment, the lower end of the arc runner 140 is located to be spaced apart from the rear end of the wing 151 by a predetermined distance.

When an arc is generated, in order to prevent excessive dispersion of the metal gas, the stationary contact point 13*a* and the most adjacent portion among the portions of the pair of wings 151 may be spaced apart by a predetermined distance.

In an exemplary embodiment, when an abnormal current is generated, the distance between the stationary contact point 13*a* and the most adjacent portion among the portions of the pair of wings 151 may be formed to be ½ or less of the distance between the pair of side portions 111.

In an exemplary embodiment, the distance between the most adjacent portions of the pair of wings 151 may be formed to be ½ or less of the distance between the pair of side portions 111.

However, when the distance between the stationary contact point 13*a* and the most adjacent portion of the pair of wings 151 is excessively adjacent, problems may occur in that it is interfered with the movable contact 14.

In consideration of this point, the distance between the most adjacent portions of the pair of wings 151 is preferably spaced apart from the distance between the pair of side portions 111 so as not to interfere with the movable contact 14.

4. Description of Another Exemplary Embodiment of the Arc Extinguishing Assembly 100 of the Present Disclosure Hereinafter, another exemplary embodiment of the arc extinguishing assembly 100 of the present disclosure will be described with reference to FIGS. 10 to 13.

The arc extinguishing assembly according to the present exemplary embodiment has the same configuration as the arc extinguishing assembly 100 according to an exemplary embodiment of the present disclosure except for the arc guide 250. Therefore, the modified arc guide 250 will be described in detail, and the rest of the configuration will be replaced with the above description.

In addition, when comparing the arc guide 250 according to the present exemplary embodiment and the arc guide 150 described above, the configuration of the arc guide 350 except for the inclined surfaces 251*b* according to the present embodiment is formed in the same way as the arc guide 150 described above. Accordingly, the rest of the configuration except for the inclined surfaces 251*b* is replaced with the description of the configuration of the arc guide 150 described above.

Hereinafter, the modified inclined surfaces 251*b* will be mainly described.

Figure 10:
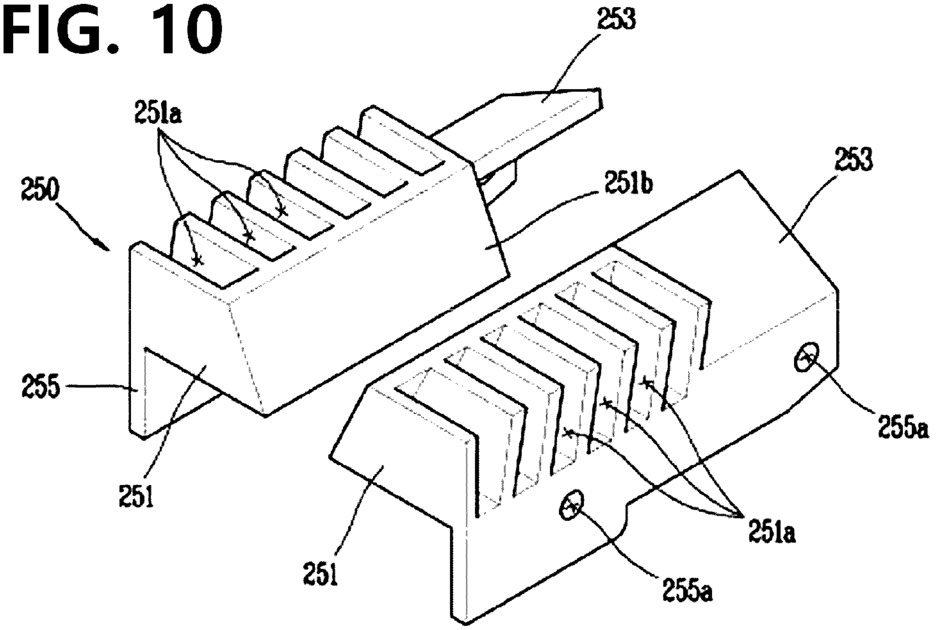
FIG. 10 is a perspective view illustrating another exemplary embodiment of the arc guide of FIG. 6.
Figure 11:
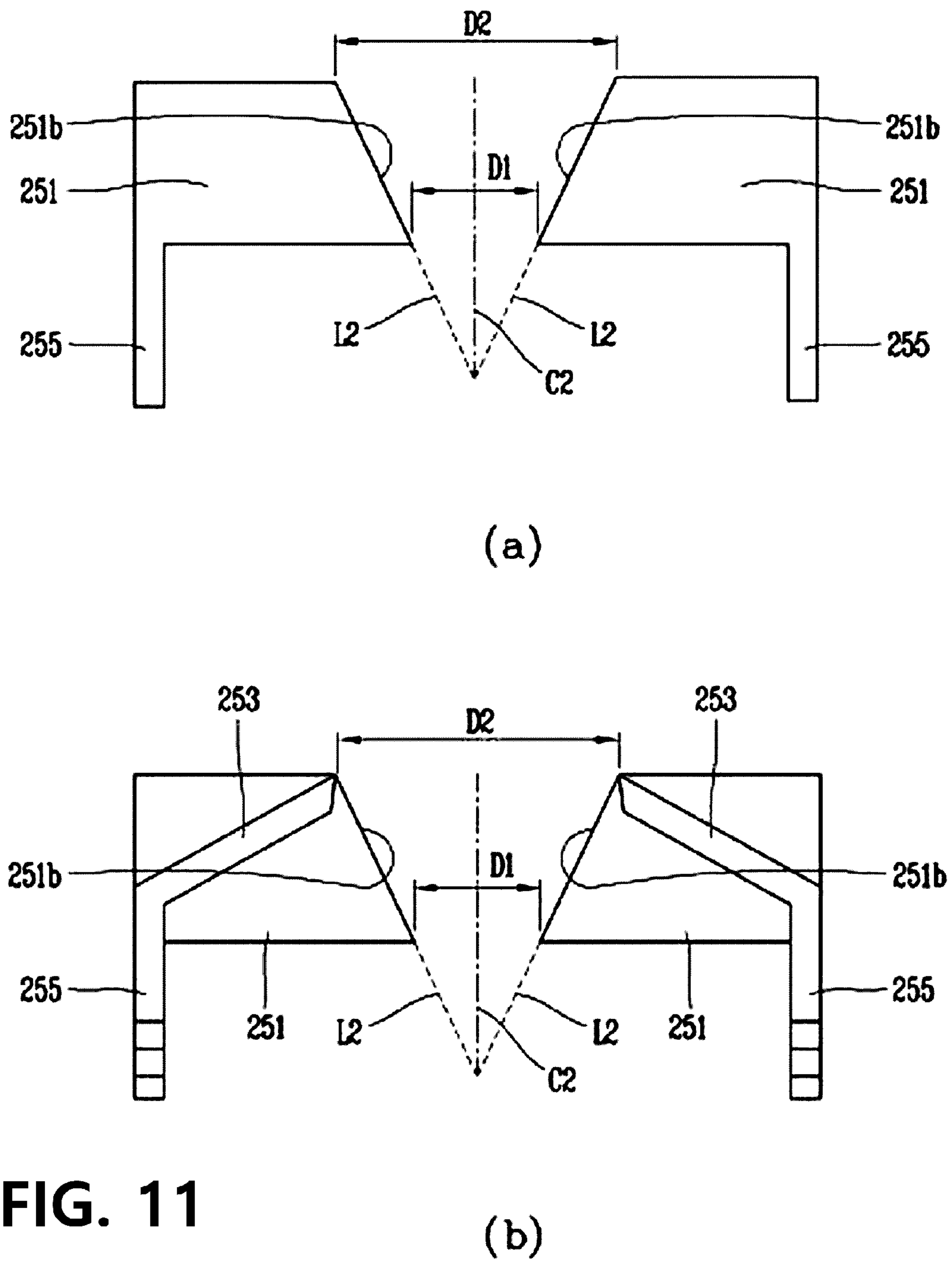
FIG. 11 is a front view and a rear view of the arc guide of FIG. 10.
Figure 12:
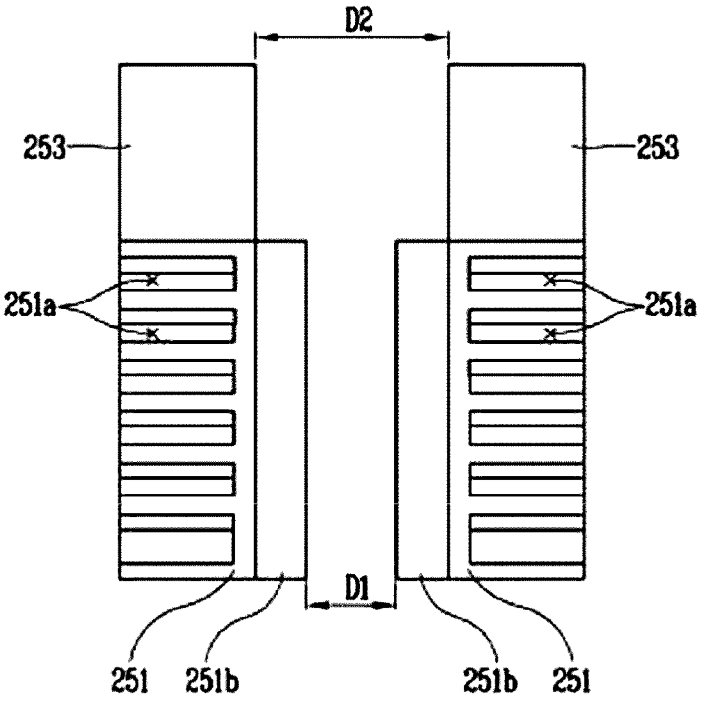
FIG. 12 is a plan view and a bottom view of the arc guide of FIG. 10.
Figure 12:
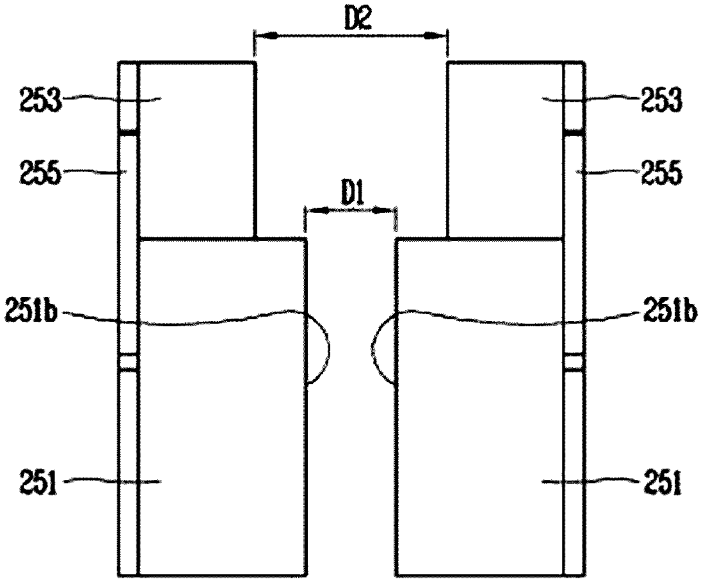

Referring to FIGS. 10 to 12, a pair of wings 251 have inclined surfaces 251*b* facing each other.

In an exemplary embodiment, the pair of wings 251 may have a trapezoidal cross-section in which the upper part is cut from a right-angled triangle. Each of the inclined surfaces 251*b* may be formed to be inclined toward the adjacent side portion 111 as it goes from the lower side to the upper side. In other words, each of the inclined surfaces 251*b* is formed to be inclined toward the adjacent side portion 111 as it approaches the exhaust 112.

That is, a virtual extension line (L2) extending along the inclination direction of each of the inclined surfaces 251*b* forms an acute angle with a virtual center line (C2) passing through the center between the inclined surfaces toward the exhaust. Accordingly, the pair of wings 251 are formed such that the distance therebetween increases from the lower side to the upper side.

Specifically, the space between the lower ends of the pair of wing units 251 are spaced apart by a first distance (D1), and the space between the upper ends are spaced apart by a second distance (D2). Herein, the value of the second distance (D2) is greater than the value of the first distance (D1). That is, the distance between the pair of wings 251 increases from the lower end toward the upper end.

The size of the space between the pair of wings 251 increases from the lower side to the upper side. As a result, when the metal gas is generated at the stationary contact point 13*a*, a temporary pressure difference occurs between the lower side and the upper side of the space between the two inclined surfaces 251*b*.

Figure 13:
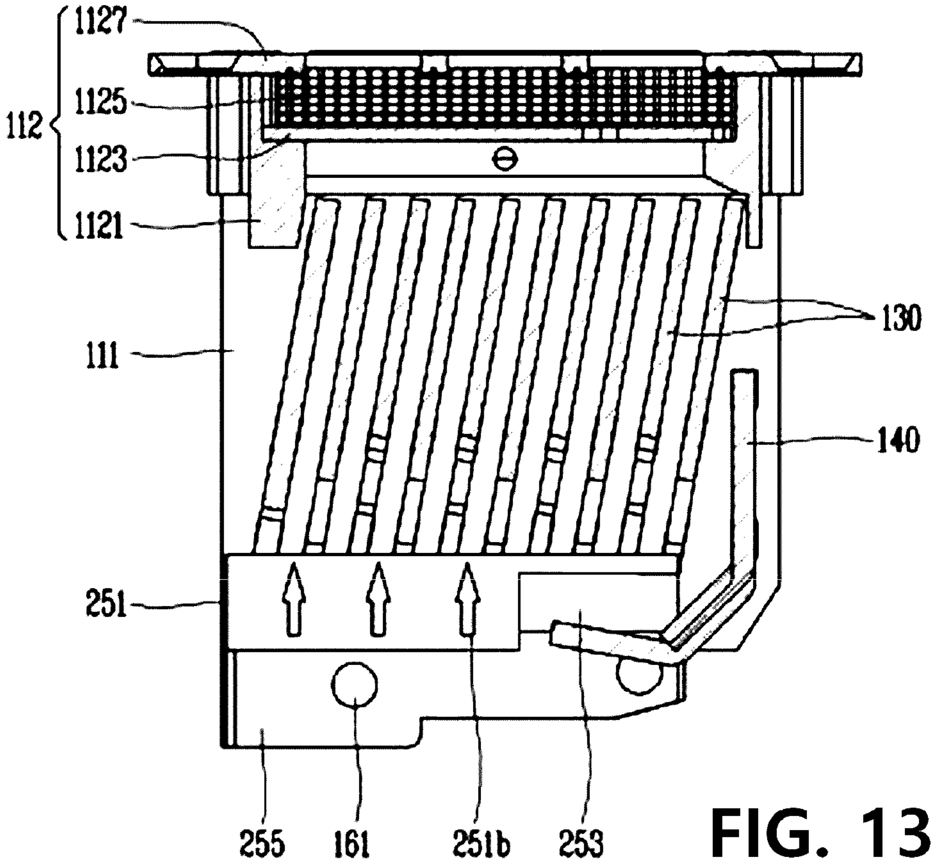
FIG. 13 is a cross-sectional view of another exemplary embodiment of the arc extinguishing assembly according to FIG. 5.

In addition, the metal gas is pushed from the lower end having a relatively high pressure to the upper end having a relatively low pressure. Accordingly, the speed at which the arc extends from the bottom to the top may be increased. Referring to FIG. 13, the direction in which the arc is pushed by a temporary pressure difference between the arc guides 250 is illustrated. As a result, the arc is extended to the grid 130 more quickly, whereby the arc extinguishing performance may be improved.

5. Description of Still Another Exemplary Embodiment of the Arc Extinguishing Assembly 100 of the Present Disclosure Hereinafter, still another exemplary embodiment of the arc extinguishing assembly 100 of the present disclosure will be described with reference to FIGS. 14 to 17.

The arc extinguishing assembly according to the present exemplary embodiment has the same configuration as the arc extinguishing assembly 100 according to an exemplary embodiment of the present disclosure except for the arc guide 350. Therefore, the modified arc guide 350 will be described in detail, and the rest of the configuration will be replaced with the above description.

In addition, when comparing the arc guide 350 according to the present exemplary embodiment and the arc guide 150 described above, the configuration of the arc guide 350 except for the inclined surface 351*b* according to the present exemplary embodiment is formed in the same way as the arc guide 150 described above. Accordingly, the rest of the configuration except for the inclined surface 351*b* will be replaced with the description of the configuration of the arc guide 150 described above.

Hereinafter, the modified inclined surfaces 351*b* will be mainly described.

Figure 14:
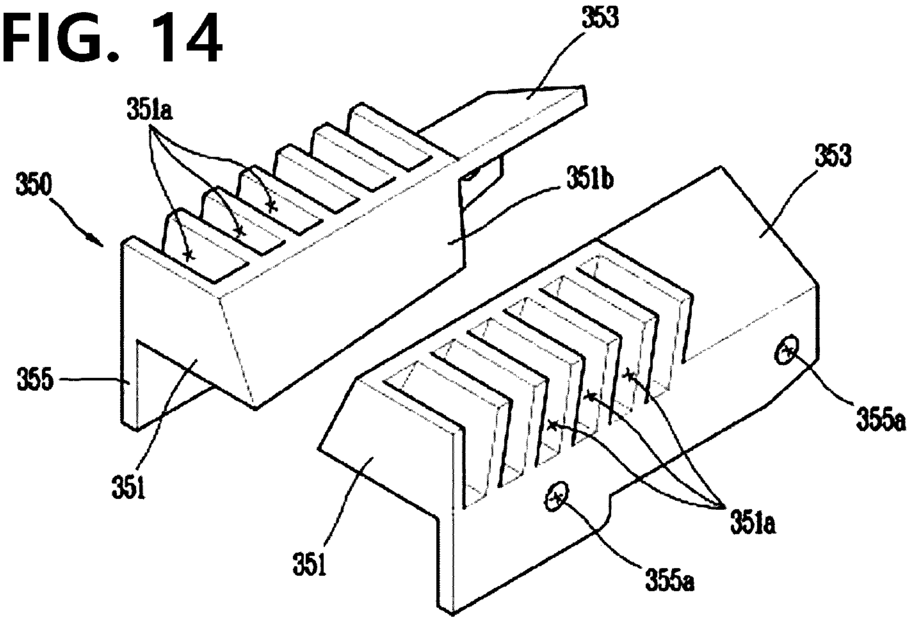
FIG. 14 is a perspective view illustrating still another exemplary embodiment of the arc guide of FIG. 6.
Figure 15:
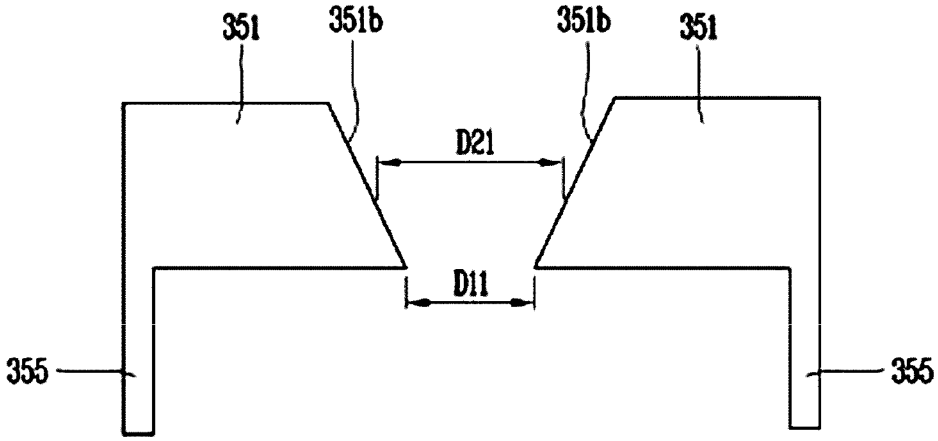
FIG. 15 is a front view and a rear view of the arc guide of FIG. 14.
Figure 15:
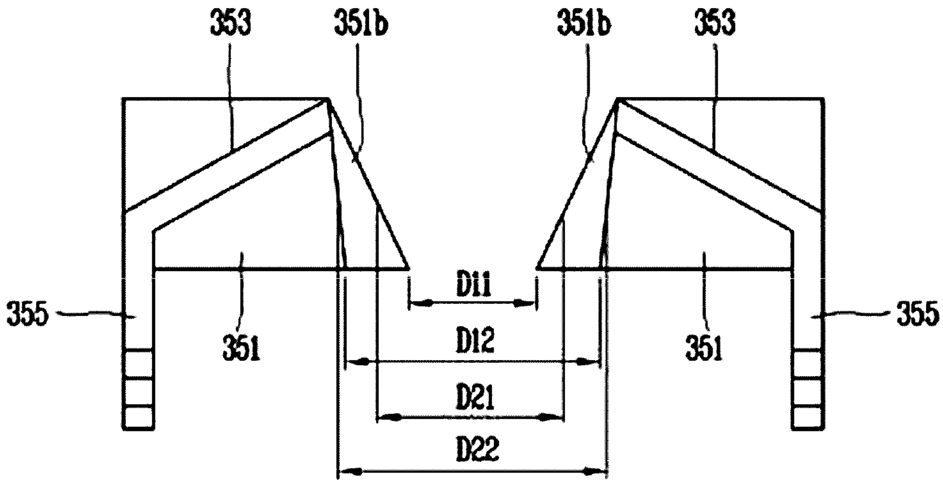
Figure 16:
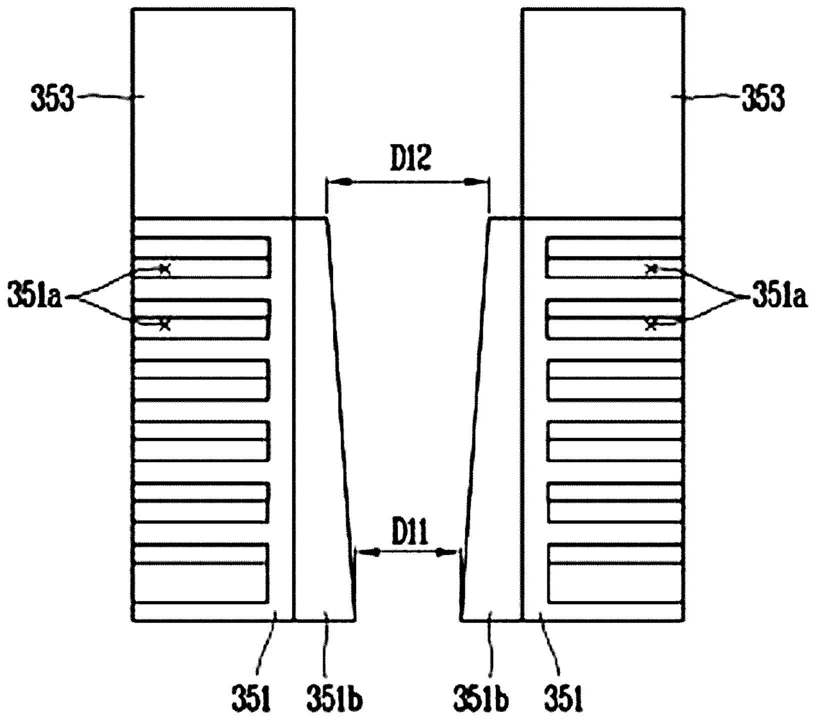
FIG. 16 is a plan view and a bottom view of the arc guide of FIG. 14.
Figure 16:
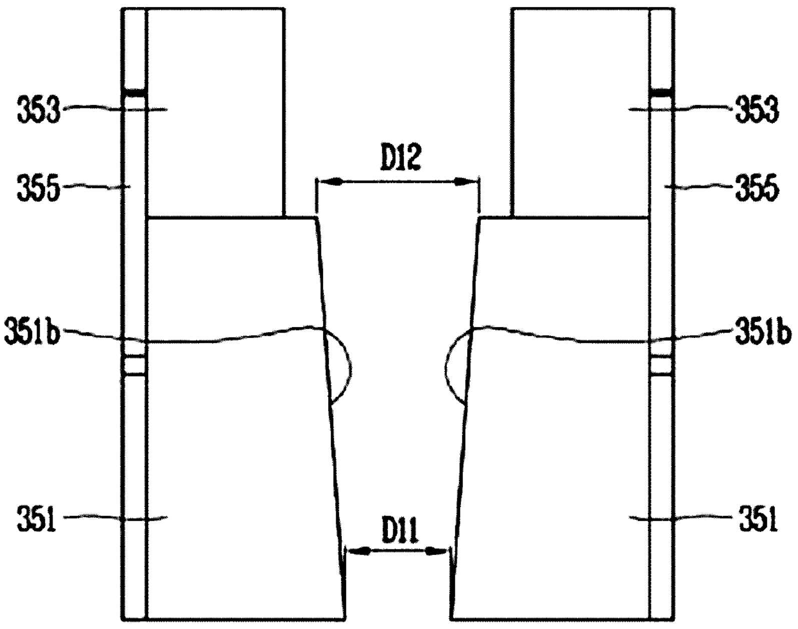

Referring to FIGS. 14 to 16, a pair of wings 351 has inclined surfaces 351*b* facing each other.

In an exemplary embodiment, the pair of wings 351 may have a trapezoidal cross-section in which the upper part is cut from a right-angled triangle. The pair of wings 351 respectively have inclined surfaces 351*b* facing each other, and each of the inclined surfaces 351*b* is formed to be inclined from the front side to the rear side and from the lower side to the upper side toward the adjacent side portion 111, respectively.

In other words, the inclined surfaces 351*b* facing each other are formed to be inclined toward the adjacent side portions 111 as they move away from the stationary contact point 13*a* and they become close to the exhaust 112, respectively. Accordingly, the distance between the inclined surfaces 351*b* increases from the front side to the rear side and from the lower side to the upper side.

Referring to (a) of FIG. 15, the front end of the pair of wings 151 is illustrated. The distance between the front ends of the pair of wing parts 151 increases from the lower side to the upper side. Specifically, the space between the pair of wing parts 151 is spaced apart by a predetermined first distance (D11) from the lower end (first point), and the space between any point (second point) between the lower end and the upper end is spaced apart by a predetermined second distance (D21) that is greater than the first distance (D11).

Referring to (b) of FIG. 15, the rear end of the pair of wings 351 is illustrated. The distance between the pair of wings 351 increases from the front side to the rear side.

At the first point, the distance between the pair of wings 351 increases from the front side to the rear side. The distance between the pair of wings 351 is gradually increased toward the rear side from the first distance D11, and is spaced apart from the rear end by a predetermined third distance (D12) that is farther than the first distance (D11).

At the second point, the distance between the pair of wings 351 increases from the front side to the rear side. The distance between the pair of wings 351 is gradually increased toward the rear side at the second distance (D21), and is spaced apart from the rear end by a predetermined fourth distance (D22) that is farther than the second distance (D11).

That is, as described above, the distance between the inclined surfaces 351*b* increases from the front side to the rear side and from the lower side to the upper side. Accordingly, the size of the space between the two inclined surfaces 351*b* increases from the front side to the rear side and from the lower side to the upper side, respectively. As a result, when an arc is generated at the stationary contact point 13*a*, a temporary pressure difference occurs in the space between the wings 351.

Figure 17:
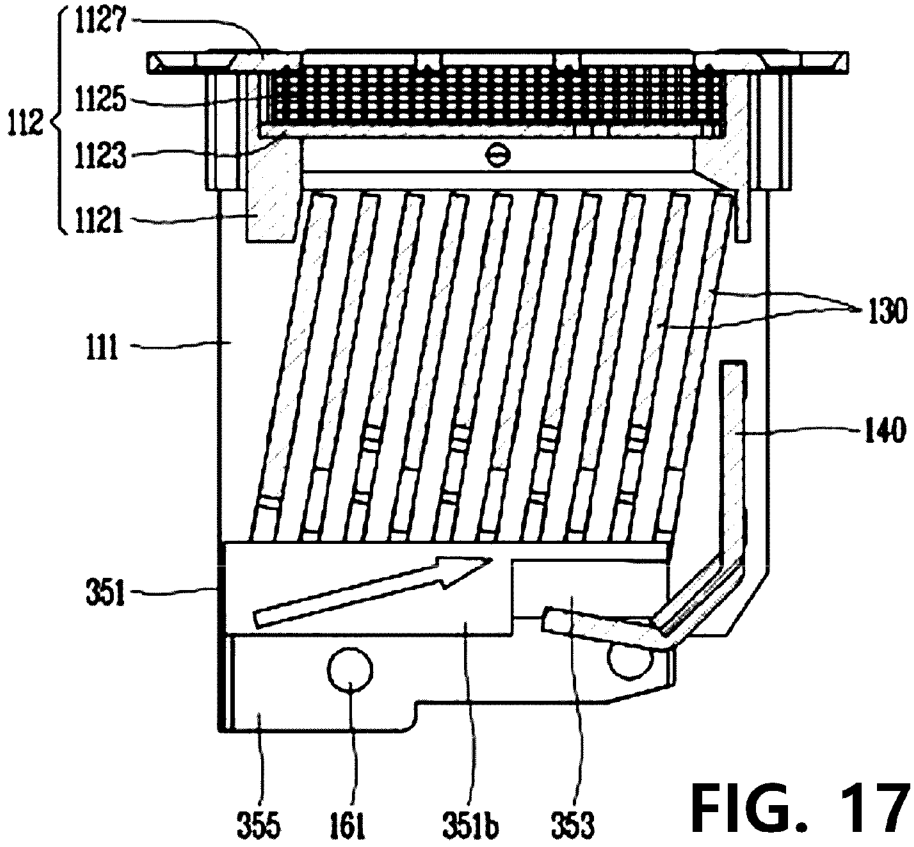
FIG. 17 is a cross-sectional view of still another exemplary embodiment of the arc extinguishing assembly according to FIG. 5.

In addition, the pressure on the front side is temporarily increased compared to the pressure on the rear side, and the pressure on the bottom side is temporarily increased compared to the pressure on the upper side. As a result, the arc is pushed backwards and upwards by the pressure difference. Accordingly, the extension length and extension speed of the arc from the front side to the rear side may be increased. In addition, the extension speed of the arc from the bottom to the top may be increased. Referring to FIG. 17, the direction in which the arc is pushed by a pressure difference between the pair of wings 351 is illustrated.

As the speed at which the arc extends backwards and upwards is increased, the arc extends more rapidly to the grid 130 and arc runner 140. Accordingly, the arc extinguishing performance may be improved.

In addition, when the voltage of the circuit is lowered, the instantaneous pressure increase generated when the stationary contact point 13*a* and the movable contact point 14*a* are spaced apart may be relatively reduced. Accordingly, the arc does not reach the arc runner 140 such that the arc extinguishing performance may be reduced.

However, when the arc guide 350 having the above-described structure is used, a decrease in the amount of pressure increase due to a decrease in the voltage of the circuit may be compensated. Accordingly, even when the voltage of the circuit is lowered, the arc may smoothly extend to the arc runner 140.

Although the preferred exemplary embodiments of the present disclosure have been described above, those of ordinary skill in the art will understand that various modifications and changes may be made to the present disclosure without departing from the spirit and scope of the present disclosure as set forth in the claims below.

The present disclosure relates to an arc extinguishing assembly and has industrial applicability because it is possible to provide an arc extinguishing assembly having an arc guide.

The invention claimed is:

1. An arc extinguishing assembly, comprising:

a frame having side portions which are spaced apart by a predetermined distance and facing each other and an exhaust connecting between the side portions from a top side of the side portions;

a plurality of grids which are inserted between the side portions, coupled to the frame, formed in a plate shape and stacked to be spaced apart from each other by a predetermined distance in a front-to-rear direction in which the plurality of grids extends;

an arc runner coupled to each of the side portions and surrounding the plurality of grids from a rear side thereof along the front-to-rear direction; and a plurality of arc guides which are located on a bottom side of the plurality of grids and extending in the front-to-rear direction, and respectively coupled to the side portions, wherein the plurality of arc guides respectively comprise wings protruding toward each other, and wherein a distance between the wings increases along the front-to-rear direction, such that the distance is shorter for portions of the wings opposite to the arc runner than portions of the wings adjacent to the arc runner.

2. The arc extinguishing assembly of claim 1, wherein each of the wings comprises inclined surfaces facing each other, and wherein each of the inclined surfaces is inclined toward an adjacent side portion along the front-to-rear direction.

3. The arc extinguishing assembly of claim 1, wherein each of the wings comprises inclined surfaces facing each other, and wherein an imaginary extension line extending along an inclination direction of each of the inclined surface forms an acute angle with an imaginary center line passing a center between the inclined surfaces in the front-to-rear direction, respectively.

4. The arc extinguishing assembly of claim 1, wherein the distance between the wings increases toward the exhaust.

5. The arc extinguishing assembly of claim 4, wherein each of the wings comprises inclined surfaces facing each other, and wherein a distance between each of the inclined surfaces increases towards the exhaust and along the front-to-rear direction.

6. The arc extinguishing assembly of claim 1, wherein the arc guide is spaced apart by a predetermined distance in the front-to-rear direction from a stationary contact point where an arc is generated, and wherein the arc extinguishing assembly further comprises a runner which is inserted between the side portions and coupled to the frame, and located to be spaced apart by a predetermined distance from the other side opposite to the one side of the plurality of grids, and has one side bent toward the stationary contact point.

7. The arc extinguishing assembly of claim 6, wherein a length of the wing in the front-to-rear direction is shorter than a distance between the stationary contact point and a bent side of the runner.

8. The arc extinguishing assembly of claim 1, wherein the grid which is coupled to the side portion respectively comprise arms on both sides, and wherein the arms are respectively inserted into the arc guide.

9. An arc extinguishing assembly, comprising:

a frame having side portions spaced apart by a predetermined distance and facing each other and an exhaust connecting between the side portions from one side of the side portions;

a plurality of grids which are inserted between the side portions, coupled to the frame, formed in a plate shape and stacked to be spaced apart from each other by a predetermined distance in a front-to-rear direction; and a plurality of arc guides which are located on one side of the plurality of grids and extending in the front-to-rear direction and provided separately from the frame, and respectively coupled to the side portions, wherein the plurality of arc guides respectively comprise:

wings protruding toward each other, that form a front part of the plurality of arc guides; and extensions extending from the wings that form a rear part of the plurality of arc guides; and wherein a distance between the wings increases toward the exhaust, wherein a distance between the wings of each of the plurality of arc guides is shorter than a distance between the extensions of each of the plurality of arc guides.

10. The arc extinguishing assembly of claim 9, wherein each of the wings comprises inclined surfaces facing each other, and wherein an imaginary extension line extending along an inclination direction of each of the inclined surfaces forms an acute angle with an imaginary center line passing a center between the inclined surfaces toward the exhaust, respectively.

11. The arc extinguishing assembly of claim 9, wherein each of the wings comprises inclined surfaces facing each other, and wherein each of the inclined surfaces is inclined toward an adjacent side portion toward the exhaust.

12. The arc extinguishing assembly of claim 9, wherein the distance between the wings increases along the front-to-rear direction.

13. The arc extinguishing assembly of claim 12, wherein each of the wings comprises inclined surfaces facing each other, and wherein each of the inclined surfaces is inclined toward an adjacent side portion along the front-to-rear direction and toward the exhaust.

14. The arc extinguishing assembly of claim 9, wherein the arc guide is spaced apart by a predetermined distance in the front-to-rear direction from a stationary contact point where an arc is generated, and wherein the arc extinguishing assembly further comprises a runner which is inserted between the side portions and coupled to the frame, and located to be spaced apart by a predetermined distance from the other side opposite to the one side of the plurality of grids, and has one side bent toward the stationary contact point.

15. The arc extinguishing assembly of claim 14, wherein a length of the wing in the front-to-rear direction is shorter than a distance between the stationary contact point and a bent side of the runner.

16. The arc extinguishing assembly of claim 9, wherein the grid which is coupled to the side portions respectively comprises arms on both sides, and wherein the arms are respectively inserted into the arc guide.

17. An arc extinguishing assembly, comprising:

a frame extending in a top-to-bottom direction from a top side to a bottom side, the frame having side portions spaced apart by a predetermined distance in a left-to-right direction from a left side to a right side of the frame and facing each other and an exhaust connecting between the side portions from one side of the side portions;

a plurality of grids which are inserted between the side portions, coupled to the frame, formed in a plate shape and stacked to be spaced apart from each other by a predetermined distance in a front-to-rear direction extending from a front side to a rear side of the frame that is perpendicular to the top-to-bottom direction and the left-to-right direction;

an arc runner coupled to each of the side portions and surrounding the plurality of grids from a rear side thereof along the front-to-rear direction; and a plurality of arc guides which are located on one side of the plurality of grids and extending in the front-to-rear direction, and respectively coupled to the side portions, wherein the plurality of arc guides respectively comprise wings protruding toward each other, and wherein a distance between the wings increases toward the rear side along the front-to-rear direction such that the distance is shorter for portions of the wings opposite to the arc runner than portions of the wings adjacent to the arc runner and toward the exhaust along the top-to-bottom direction.

18. The arc extinguishing assembly of claim 17, wherein each of the wings comprises inclined surfaces facing each other, and wherein each of the inclined surfaces is inclined toward an adjacent side portion along the front-to-rear direction and toward the exhaust.

19. The arc extinguishing assembly of claim 17, wherein the arc guide is spaced apart by a predetermined distance in the front-to-rear direction from a stationary contact point where an arc is generated, wherein the arc extinguishing assembly further comprises a runner which is inserted between the side portions and coupled to the frame, and located to be spaced apart by a predetermined distance from the other side opposite to the one side of the plurality of grids, and has one side bent toward the stationary contact point, and wherein a length of the wing in the front-to-rear direction is shorter than a distance between the stationary contact point and a bent side of the runner.

20. The arc extinguishing assembly of claim 17, wherein a closest distance among the distances between the wings is formed to be ½ or less of the distance between the side portions.

* * * * *